June 20, 1950     J. W. FRENCH     2,512,321
MOUNTING FOR OBSERVATION INSTRUMENTS
Filed Oct. 26, 1946
FIG: 1.
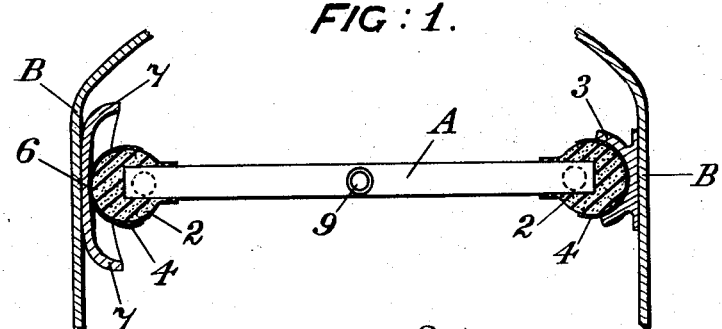
FIG: 2.
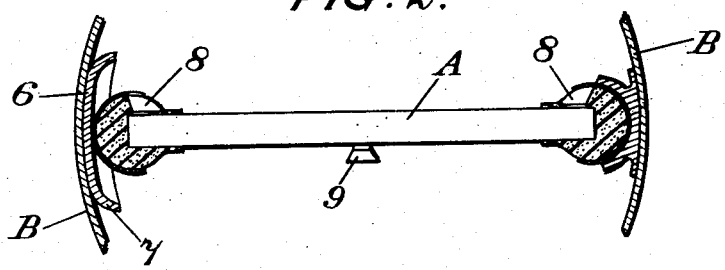
FIG: 3.
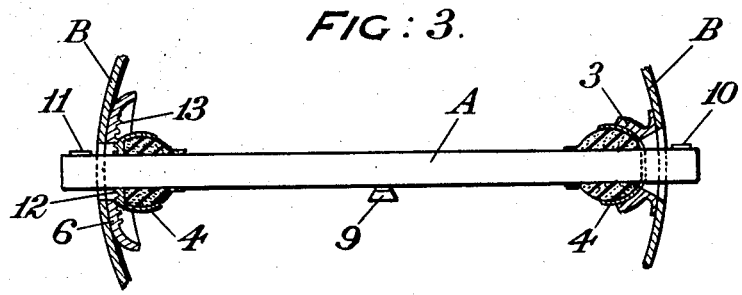
FIG: 4.
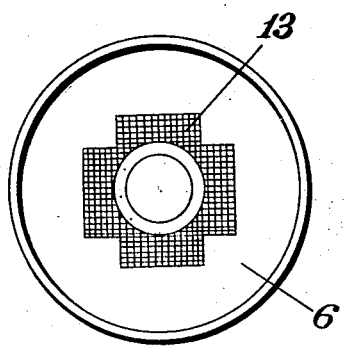
FIG: 5.
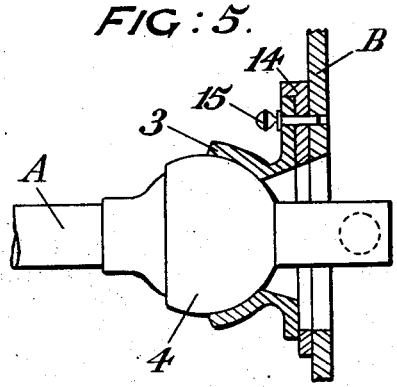
Inventor
JAMES WEIR FRENCH
By
his Attorney Patented June 20, 1950

2,512,321

UNITED STATES PATENT OFFICE 2,512,321

MOUNTING FOR OBSERVATION INSTRUMENTS

James Weir French, Glasgow, Scotland, assignor to Barr & Stroud, Limited, Glasgow, Scotland Application October 26, 1946, Serial No. 705,856
In Great Britain February 7, 1944

Section 1, Public Law 690, August 8, 1946
Patent expires February 7, 1964

6 Claims. (Cl. 248—251)

1

This invention relates to mountings for observation instruments such as rangefinders, and is particularly concerned with rangefinders used upon aircraft or in tanks where a central mounting or pedestal for the instrument would be an undesirable obstruction, where vibration may be considerable, where some independent directional adjustment of the rangefinder relatively to the fixed structure or a turret is desirable, and where the instrument should be capable of quick removal for storage or other purposes.

An object of the invention is to provide a mounting for observation instruments having an elongated base casing, such as rangefinders, by means of which the instrument can be angled about a ball and socket mounting adjacent one end thereof, and having a support adjacent the other end, said support frictionally engaging the base casing, whereby the instrument may be easily moved about said ball and socket mounting and remains in place when so moved.

Some examples of construction will now be described with reference to the accompanying drawing, in which—

Figure 1 is an elevation and Figure 2 is a plan, both partly in section, showing a rangefinder mounted in a turret, Figure 3 is a plan showing a modified mounting for a rangefinder in a turret, Figure 4 is an end elevation showing a detail of the construction shown in Figure 3, and Figure 5 is an elevation, partly in section, showing another detail.

In the figures, A denotes the rangefinder and B the turret.

In Figures 1 and 2, the rangefinder A comprises a base structure or casing provided at its ends with resilient shock-absorbing means in the form of anti-vibration elements 2 composed of rubber or of the other type, both ends having sheathings 4. The right hand sheathing is located in a spherical socket 3 fixed to the structure B thus forming a ball and socket mounting. At the opposite end, the sheathing 4 is contained within a mounting comprising a support in the form of a guide or trough 6 which permits of angling movement of the rangefinder about the other end, the guide being elongated in the required direction, and being saucer-shaped when angling is to be provided for in all directions, end portions 7 being provided to restrict the movement under normal conditions of working.

For changing the elevation of the line of sight, the rangefinder A can be rotated within the elements 2, apertures 8 being provided for the passage of the rays of light into the ends of the rangefinder.

An operator seated at the eyepiece 9 of the rangefinder is not obstructed by any portion of the mounting. The pressure of the anti-vibration material 2 is such that the sheathing 4 at the left hand end will be maintained in contact with the guide 6 while permitting the rangefinder to be inclined about the ball and socket mounting at the right hand end, and at the same time be rotated for elevation. By slight endwise compression towards the socket, the pressure may be reduced sufficiently to enable easy angling of the instrument.

Figure 3 represents a rangefinder A having its ends 10 and 11 projecting through the structure B. The right hand element 4 is carried in a spherical socket 3 and at the left hand end the sheath 4 is provided with teeth 12, which engage with corresponding teeth 13 on the inner surface of the guide 6. When the rangefinder is pressed towards the right, the teeth are disengaged and may be re-engaged when the desired position is attained.

The teeth 13 on the guide 6 are shown in more detail in Figure 4. They comprise intersecting lines of teeth in the vertical and horizontal direction on a surface, curved if necessary, about the centre of the sheath 4. Similar teeth may be provided on the sheath 4 at the left hand end.

By extension of the edges 7, the trough 6, Figure 1, may be so arranged that under shock the rangefinder will not become disengaged from its supports. In such a case the arrangement indicated in Figure 5 may be provided to facilitate the removal of the instrument. The socket 3 is mounted upon a slide 14 carried upon the structure B and retained in position by a pin 15. When the pin 15 is withdrawn the socket may be displaced, say downwards, with reference to the slide 14 sufficiently far to permit of the left hand end being disengaged from the guide, slots of suitable length being provided in the structure B to permit of the complete withdrawal of the instrument.

I claim:

1. In combination, an observation instrument having an elongated base structure, ball and socket mounting for said structure adjacent one end thereof, and adjacent the other end thereof a second mounting comprising a support which makes a clearance with the base structure in different directions transversely of the base structure, but said support frictionally engaging the base structure in the direction longitudinally thereof, whereby the instrument may be easily moved about said ball and socket mounting and remains in place when so moved.

2. In combination, an observation instrument having an elongated base structure, a ball and socket mounting for said structure adjacent one end thereof, and adjacent the other end thereof a second mounting comprising a support which makes a clearance with the base structure in different directions transversely of the base structure, but said support frictionally engaging the base structure in the direction longitudinally thereof, whereby the instrument may be easily moved about said ball and socket mounting and remains in place when so moved, and resilient shock-absorbing means interposed between each of said mountings and the base structure.

3. In combination, an observation instrument having an elongated base structure, a ball and socket mounting for said structure adjacent one end thereof, and adjacent the other end thereof a second mounting comprising a support which makes a clearance with the base structure in different directions transversely of the base structure, but said support frictionally engaging the base structure in the direction longitudinally thereof, whereby the instrument may be easily moved about said ball and socket mounting and remains in place when so moved, stop means for limiting the movement of said base structure transversely of the second mounting, and resilient shock-absorbing means interposed between each of said mountings and the base structure.

4. In combination, an observation instrument having an elongated base structure, a ball and socket mounting for said structure adjacent one end thereof, and adjacent the other end thereof a second mounting comprising a support which makes a clearance with the base structure in different directions transversely of the base structure, but said support frictionally engaging the base structure in the direction longitudinally thereof, whereby the instrument may be easily moved about said ball and socket mounting and remains in place when so moved, resilient shock-absorbing means interposed between each of said mountings and the base structure, and interengaging projections on said frictionally engaging parts of the base structure and said second mounting, such projections being disengageable by endwise compression of said shock-absorbing means, in order to allow transverse movement of the base structure about said ball and socket mounting.

5. In combination in a vehicle, an observation instrument having an elongated base casing, a ball and socket mounting for said casing adjacent one end thereof, and adjacent the other end thereof a second mounting comprising a support arcuate about said ball and socket mounting and which makes a clearance with the base casing in different directions transversely of the base casing, but said support frictionally engaging the base casing in the direction longitudinally thereof, whereby the casing may be easily moved about said ball and socket mounting and remains in place when so moved, and resilient shock-absorbing means between each of said mountings and the base casing.

6. The combination claimed in claim 1, in which one of said mountings is displaceable relative to the other transversely of the base structure in order to facilitate removal of the latter from the mountings.

JAMES WEIR FRENCH.

REFERENCES CITED

The following references are of record in the file of this patent:

UNITED STATES PATENTS

| Number | Name | Date |
|--------|------|------|
| 640,661 | Johnstone | Jan. 2, 1900 |
| 704,403 | Thill | July 8, 1902 |
| 1,012,063 | Davis | Dec. 19, 1911 |
| 1,416,841 | Kretschmar | May 23, 1922 |
| 1,623,473 | Gurney | Apr. 5, 1927 |